(12) United States Patent
Elliott

(10) Patent No.: US 6,388,668 B1
(45) Date of Patent: May 14, 2002

(54) FUNCTIONAL ANIMATION INCLUDING SPRITE TREE GENERATOR AND INTERPRETER

(75) Inventor: Conal M. Elliott, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/356,254

(22) Filed: Jul. 16, 1999

Related U.S. Application Data

(63) Continuation-in-part of application No. 09/337,701, filed on Jun. 21, 1999.
(60) Provisional application No. 60/093,487, filed on Jul. 20, 1998.

(51) Int. Cl.[7] .............................................. G06T 17/00
(52) U.S. Cl. ...................................... 345/474; 345/619
(58) Field of Search ................................ 345/419, 418, 345/473, 474, 475, 619

(56) References Cited

U.S. PATENT DOCUMENTS 6,285,794 B1 * 9/2001 Georgiev et al. ........... 345/474

OTHER PUBLICATIONS

Conal Elliott and Paul Hudak "Functional Reactive Animation" (date unknown).
Conal Elliott, Technical Report MSR–TR–96–05, A Brief Introduction to Active VRML, pp. 1–27, (Feb., 1996).
Simon P. Jones et al., "Concurrent Haskell", POPL—ACM 089791–769, pp. 295–308 (1996).
Kavi Arya, J. Functional Progamming 4 (1): "A Functional Animation Starter–Kit"–pp. 1–18, (Jan. 1994).

John Rohlf, et al. Computer Graphics Proceedings, Annual Conf. Series, IRIS Performer: A High Performance Multi-processing Toolkit for Real–Time 3D Graphics, pp. 381–394, (1994).
John Peterson et al., Fran Users Manual, "Fran 1.1 Users Manual" pp. 1–21 (Jul. 31, 1998).
John Huges, "Lazy Memo–Functions" pp. 128–146, (yr. Unknown).

(List continued on next page.)

Primary Examiner—Cliff N. Vo
(74) Attorney, Agent, or Firm—Watts, Hoffmann, Fisher & Heinke, Co., L.P.A.

(57) ABSTRACT

The invention provides a device for converting data types corresponding to functional animations into a form that is amenable to fast renderings of the animation by using of a presentation library. It therefore bridges a gap between the high level flexibility needed to formulate animations with the low level rigid structuring imposed by presentation software that directly interfaces with image rendering and sound presenting hardware. A spite engine interprets a list of sprites which is created and updated by a normalizer software component. The sprite engine must interpret its list at a refresh rate suitable for rendering video images. The normalizer must deal with the functional data types built by the functional animation software and convert those data types into lists of sprites. The two components (sprite engine and normalizer) operate in synchronism in different threads started by the operating system to render smooth animation images but using an intuitive composing system such as the functional animation software. The normalizer may (depending on events that may occur in the animation) replace the sprite list anchored at this point of mutability with another such list as needed. A contiguous subsequence of sprites for an animated object may therefore be introduced, removed, or replaced without the necessity of reconstructing the entire list.

41 Claims, 6 Drawing Sheets

OTHER PUBLICATIONS

Paul S. Strauss et al., Computer Graphics Proceedings, "An Object–oriented 3D Graphics Toolkit" pp. 343–349, vol. 26, No. 2 (Jul. 1992).

Jay Torborg, et al., Computer Graphics Proceedings, Annual Conf. Series, "Talisman: Commodity Realtime 3D Graphics for the PC " pp. 353–363 (1996).

Paul Hudak et al., ACM Sigplan Notices, "A Gentle Introduction to Haskell", vol. 27, No. 5 pp. T1–T53. No. 5 (May 1992).

Paul Hudak, et al. ACM Sigplan Notices, Report on the Prgramming Language Haskell, "A Non–strict, Purely Functional Language", vol. 27,No. 5, Version 1.2 pp. Rii–R164 (1992).

* cited by examiner

FUNCTIONAL ANIMATION INCLUDING SPRITE TREE GENERATOR AND INTERPRETER

CROSS REFERENCE TO RELATED APPLICATIONS

The present application is a continuation in part of co-pending application Ser. No. 09/337,701 entitled "Functional Animation including Sprite Engine for Video Imaging" having a filing date of Jun. 21, 1999. The present application also claims priority from U.S. provisional patent application Ser. No. 60/093,487 filed on Jul. 20, 1998, entitled "Functional Animation using Sprite-Based Presentation" which is incorporated herein by reference.

FIELD OF THE INVENTION

The present invention relates to computer imaging and more particularly to method and apparatus for converting functional animations into a form that can be efficiently updated at a rate required for visual presentation on a video display.

BACKGROUND ART

Computer generated animations have wide applications and have improved as hardware has improved. As the personal computer industry has evolved into a multi-billion dollar economy, high quality graphics rendering systems have become less expensive. Graphics systems once costing many hundreds of thousands of dollars are now available at a fraction of that cost.

A standard means of displaying images on a viewing screen is to first format the image into a bitmapped image and transfer the bitmapped image to a region of video memory. As the computer is composing a next subsequent bitmapped image video hardware accesses the first region of video memory that was previously formatted and causes video signals to be generated and coupled to a viewing monitor. Once the next subsequent region of memory has been formatted, the video hardware switches to the memory region containing that bitmapped image to generate appropriate video driver signals. This back and forth switching occurs at video refresh rates of display rates of at least 60 frames per second.

Lower level presentation libraries for sprite-based display and sound presentation are designed not for convenience of a program's author or readers, but rather for efficient execution on anticipated video and/or audio hardware. These presentation libraries impose rigid structure, in order to allow acceleration by hardware and low level software. Programs written directly on top of these libraries must adapt to relatively inflexible representations and tend to be relatively non-modular. Writing software that directly interfaces the presentation libraries is not an easy task and to successfully program for these libraries one must adher to the hardware protocols rather closely. The rigorous adherence to video presentation standards can make the process of producing an effective animation more difficult. There are existing programming languages that are well suited to accomplishing animation in a more intuitive way. A functional approach to animation offers considerable flexibility and modularity and is described, for example, in Arya, Kavi, "A Functional Animation Starter-Kit," *Journal of Functional Programming*, Vol. 4, No. 1, pp. 1–18 (January 1994), and in Elliott, Conal, and P. Hudak, "Functional Reactive Animation," *Proceedings of the 1997 ACM SIGPLAN International Conference on Functional Programming*, Amsterdam, The Netherlands, pp. 263–273 (Jun. 9–11, 1997), which is herein incorporated by reference. Functional animation encourages a highly modular programming style by supplying a set of arbitrarily composable functions for building up animations.

These functional programming languages treat animations as values or elements of a data type consisting of a set of constants and combining operators. The use of an animation data type allows great flexibility in composing these basic building blocks into either directly useful or attractive animations, or new building blocks, parameterized as desired. Moreover, animation is a polymorphic notion since the functions implementing the animation can be applied to different types. Animation can be applied to 2D images, 3D geometry, and constituent types like colors, points, vectors, numbers, booleans, etc. Consequently, there is not just one type, but a collection of types and type constructors. Such a system of data types imposes just enough discipline to rule out nonsensical compositions (such as rotating by the angle "purple"), without inhibiting the author's creativity. In this way, the data types are designed to serve the need of the author (and readers) of an animation.

SUMMARY OF THE INVENTION{tc "SUMMARY OF THE INVENTION" \l 5}

A computer animation system constructed in accordance with the invention animates a computer presentation that includes both images and sound. A component referred to as a normalizer interprets an animation to produce a data structure of image and sound objects. At video and audio refresh rates this data structure is in turn interpreted by a rendering software component referred to herein as a sprite engine.

The exemplary embodiment of the invention renders the animation by first describing or defining the computer animation in a high level functional programming language program. At presentation update intervals the contents of a presentation data structure are updated based on the time varying computer presentation. At presentation refresh intervals more frequent than the update intervals, a computer presentation data set is composed that approximates a change of the computer presentation between the update intervals. At a sensory presentation rate greater than a rate at which the presentation data structure is updated, the computer presentation data is sent to rendering hardware to perform the computer animation.

Computer animation typically involves a visual images that are periodically updated. The presentation data structure for this type animation includes a sequence of images that are displayed on a viewing monitor. In a bitmapped imaging process, the visual image description is data that is stored in a region of the computer memory. The frequency of the presentation refresh rate is high enough to smoothly update such video images.

The computer animation may also include an audible rendering. For an audible animation the frequency and volume of the output signal is updated rather than updating a part of memory.

In accordance with an exemplary embodiment of the invention, the presentation data structure is a sprite tree. The sprite tree is made up of a series of nodes with sprites at the leaves and behavior modifications at interior nodes of the sprite tree. The sprite interpreter or sprite engine animates the sprites that make up the sprite tree by performing a 'paint' function for each sprite leaf in the tree. In the instance of a sound sprite the 'paint' method provides an audible output from an audible hardware interface.

Use of a sprite tree datastructure facilitates the updating of the animation. Updating of the sprite tree data structure may only require an updating of a portion of the sprite tree affected by a user controlled input. This requires a replacement of an internal node of the sprite tree and all sprites descending from this so-called mutable node but does not require a complete re-construction of the sprite tree.

A normalizer component updates sprite positions much less frequently than needed to achieve video refresh rates. Between successive updates of the sprite tree the sprite tree engine renders the sprites at positions intermediate the end points determined by the normalizer component. The positions of these intermediate positions are determining by linearly interpolating between the two end points.

In one embodiment of the present invention, the computer animation is represented in a high level programming language such as Haskell (note, other functional animation programming languages could also be used) which allows the animation to be more easily programmed. This high level animation representation is converted by the normalizer component into a presentation data structure based on the time varying computer presentation defined in the Haskell program. The normalizer component defines a series of different methods that convert legal constructs from the Haskell representation to the presentation data structure by determining which of said different methods matches the Haskell animation representation. The sprite tree engine composes a bit mapped image from the data in the presentation data structure at refresh intervals and transmits the computer presentation data to rendering hardware to perform the computer animation. The preferred normalizer component recursively calls the methods until the method includes an instruction to add a sprite (image or sound) to a list of sprite trees.

A preferred computer for practicing the invention includes an operating system that can spawn multiple executing threads. In such an environment the step of updating the contents of the presentation data structure executes in a first thread and the step of accessing data stored in the data structure and composing computer presentation data executes in a second thread. The second thread executes in a higher priority thread.

These and other objects, advantages and features of the invention will become better understood from the disclosed exemplary embodiment of the present invention which is described in conjunction with the accompanying drawings.

BRIEF DESCRIPTION OF THE DRAWINGS

The present invention is illustrated by way of example and not limitation in the figures of the accompanying drawings, in which like references indicate similar elements and in which.

DETAILED DESCRIPTION OF THE INVENTION

A functional animation sprite-based presentation system in accordance with the present invention bridges the gap between functional specification and sprite-based presentation of animation.

1. Exemplary Operating Environment

Figure 1:
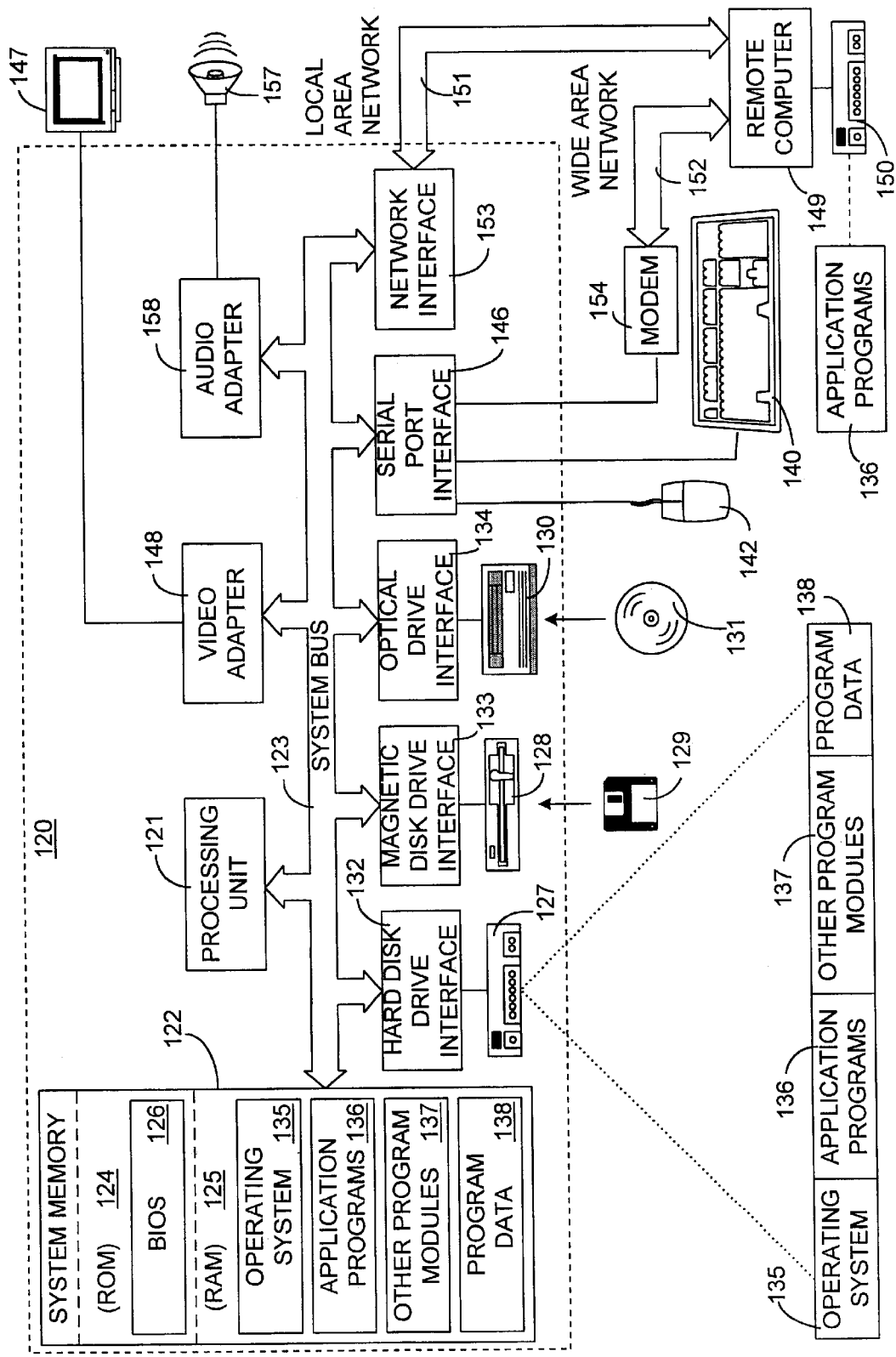
FIG. 1 illustrates an exemplary operating environment for a functional animation sprite-based presentation system.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc., that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional personal computer 120, including a processing unit 121, a system memory 122, and a system bus 123 that couples various system components including system memory 122 to processing unit 121. System bus 123 may be any of several types of bus structures including a memory bus or memory controller, a peripheral bus, and a local bus using any of a variety of bus architectures. System memory 122 includes read only memory (ROM) 124 and random access memory (RAM) 125. A basic input/output system (BIOS) 126, containing the basic routines that help to transfer information between elements within personal computer 120, such as during start-up, is stored in ROM 124. Personal computer 120 further includes a hard disk drive 127 for reading from and writing to a hard disk, a magnetic disk drive 128 for reading from or writing to a removable magnetic disk 129, and an optical disk drive 130 for reading from or writing to a removable optical disk 131 such as a CD ROM or other optical media. Hard disk drive 127, magnetic disk drive 128, and optical disk drive 130 are connected to system bus 123 by a hard disk drive interface 132, a magnetic disk drive interface 133, and an optical drive interface 134, respectively. The drives and their associated computer-readable media provide nonvolatile storage of computer-readable instructions, data structures, program modules and other data for personal computer 120. Although the exemplary environment described herein employs a hard disk, a removable magnetic disk 129 and a removable optical disk 131, it should be appreciated by those skilled in the art that other types of computer-readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 129, optical disk 131, ROM 124 or RAM 125, including an operating system 135, one or more application programs 136, other program modules 137, and program data 138. A user may enter commands and information into personal computer 120 through input devices such as a keyboard 140 and pointing device 142. Other input devices may include a microphone, joystick, game pad, satellite dish, scanner, or the like. These and other input devices are often connected to processing unit 121 through a serial port interface 146 that is coupled to system bus 123, but may be connected by other interfaces, such as a parallel port, game port or a universal serial bus (USB). A monitor 147 or other type of display presentation device is also connected to system bus 123 via an interface, such as a video adapter 148. One or more speakers 157 or other type of audio presentation device are connected to system bus 123 via an interface, such as an audio adapter 158. Personal computers typically include other peripheral output devices, such as printers.

Personal computer 120 may operate in a networked environment using logical connections to one or more remote computers, such as a remote computer 149. Remote computer 149 may be another personal computer, a server, a router, a network PC, a peer device or other common network node, and typically includes many or all of the elements described above relative to personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets and the Internet.

When used in a LAN networking environment, personal computer 120 is connected to local network 151 through a network interface or adapter 153. When used in a WAN networking environment, personal computer 120 typically includes a modem 154 or other means for establishing communications over wide area network 152, such as the Internet. Modem 154, which may be internal or external, is connected to system bus 123 via serial port interface 146. In a networked environment, program modules depicted relative to personal computer 120, or portions thereof, may be stored in remote memory storage device 150. It will be appreciated that the network connections shown are exemplary and other means of establishing a communications link between the computers may be used.

2. Functional Animation Sprite-based Presentation System

Figure 2:
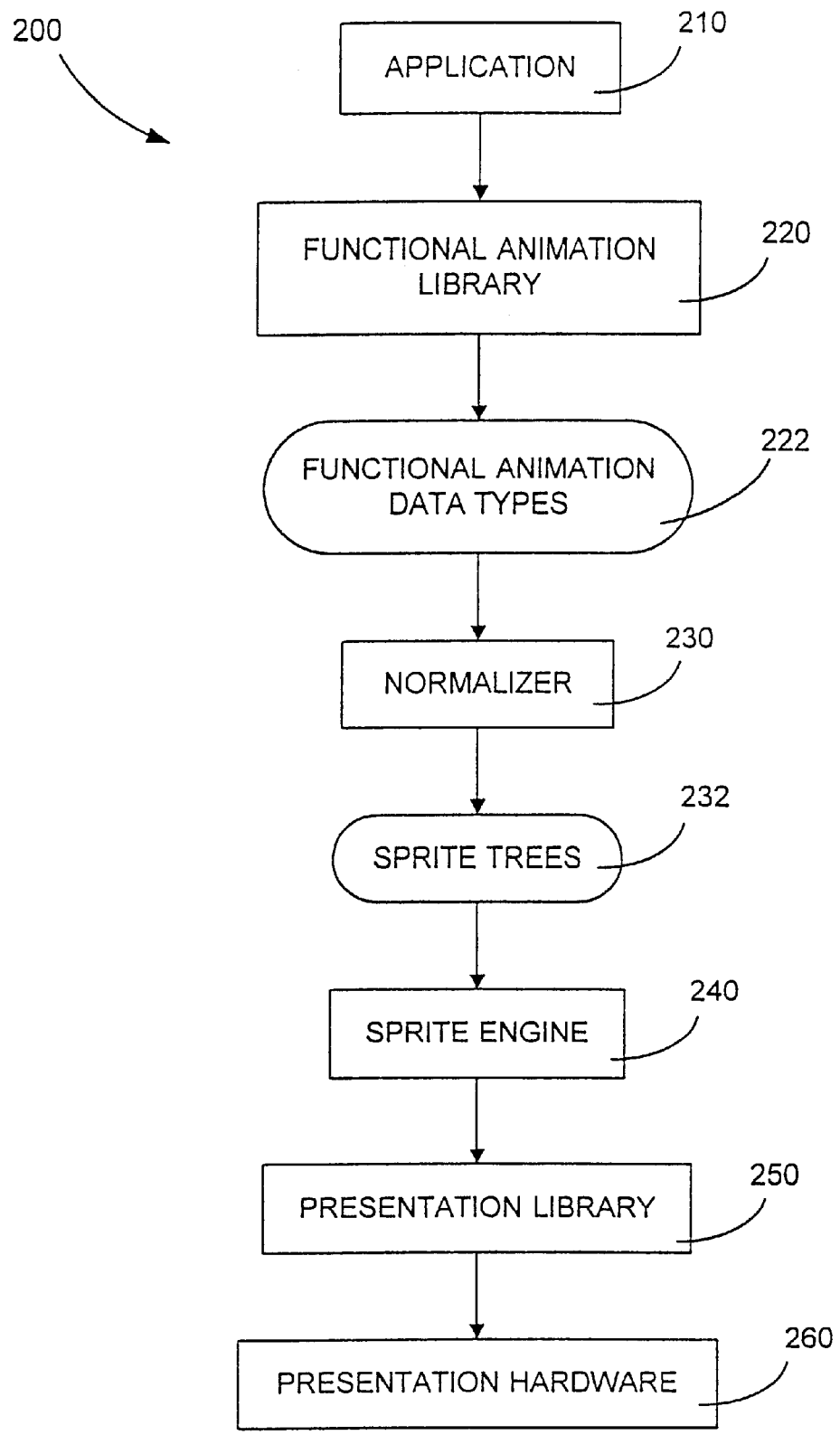
FIG. 2 illustrates, for one embodiment, a functional animation sprite-based presentation system.

FIG. 2 illustrates for one embodiment a functional animation sprite-based presentation system 200 comprising a functional animation application 210, a functional animation library 220, an animation normalizer 230, a temporal sprite engine 240, a sprite-based presentation library 250, and presentation hardware 260. Application 210, functional animation library 220, normalizer 230, sprite engine 240, and presentation library 250 for one embodiment are implemented as program modules or computer-executable instructions and may be stored on any suitable computer-readable medium for execution in a suitable operating environment, such as the computing environment of FIG. 1 for example.

Application 210 specifies one or more animations to be presented using sprite-based presentation library 250 and presentation hardware 260. Presentation library 250 comprises suitable lower level software to interface with and control presentation hardware 260 for presenting animations specified by application 210. Presentation library 250 for one embodiment comprises DirectX® by Microsoft® Corporation. Presentation library 250 may comprise, for example, DirectDraw®, DirectSound®, or Direct3DRM, which is a part of Direct3D®, by Microsoft® Corporation. Presentation library 250 may also comprise Inventor or Performer by Silicon Graphics Inc. Presentation hardware 260 may comprise any suitable hardware for animation presentation. Presentation hardware 260 for one embodiment comprises suitable hardware, such as video adapter 148 and monitor 147 for example, to display animations and/or suitable hardware, such as audio adapter 158 and speakers 157 for example, to present sound animations. Presentation hardware 260 may comprise other suitable hardware to present animations using robotics, for example.

Application 210 may be implemented in any suitable programming language, such as the purely functional language Haskell as described, for example, in Hudak, Paul, and J. H. Fasel, "A Gentle Introduction to Haskell," *SIGPLAN Notices*, Vol. 27, No. 5 (May 1992) and Hudak, Paul, S. L. Peyton Jones, and (editors) Philip Wadler, "Report on the Programming Language Haskell: A Non-strict Purely Functional Language (Version 1.2)," *SIGPLAN Notices*, (March 1992). Application 210 specifies one or more animations supported by functional animation library 220.

The functional animation library 220 may comprise any suitable animation building blocks and may provide support for implementing animations in any suitable programming language. Functional animation library 220 for one embodiment is Fran (Functional reactive animation) as described, for example, in Elliott, Conal, and P. Hudak, "Functional Reactive Animation," *Proceedings of the* 1997 *ACM SIGPLAN International Conference on Functional Programming*, Amsterdam, The Netherlands, pp. 263–273 (Jun. 9–11, 1997); Elliott, Conal, "Modeling Interactive 3D and Multimedia Animation with an Embedded Language," *The Conference on Domain-Specific Languages*, Santa Barbara, Calif., pp. 285–296 (October 1997), which is herein incorporated by reference; and Elliott, Conal, "Composing Reactive Animations," *Dr. Dobb's Journal* (July 1998), which is herein incorporated by reference. Fran is implemented in Haskell and supports Haskell. Although described in the context of Fran, the present invention may be used with other suitable animation libraries.

The execution of application 210 over functional animation library 220 constructs functional animation data types 222 to define the one or more animations for presentation. Functional animation data types 222 may be implemented in the form of one or more suitable data structures and may also be stored on any suitable computer-readable medium, Functional animation data types 222 for Fran are described, for example, in Elliott, Conal, "A Brief Introduction to ActiveVRML," Technical Report MSR-TR-96-05, Microsoft® Research, Microsoft® Corporation, Redmond, Wash. (February 1996), which is herein incorporated by reference.

The normalizer 230 bridges the gap between the high level flexibility desired for specification of animations and the low level regularity imposed by sprite engine 240. The normalizer 230 transforms the flexibly specified animations into the form required by the sprite engine 240. Normalizer 230 constructs and updates a list of sprite trees 232 based on several algebraic properties of functional animation data types 222. Normalizer 230 may be implemented in any suitable language, such as Haskell for example. Although described as separate modules, application 210, functional animation library 220, and/or normalizer 230 may alternatively be integrated. Alternatively, an imperative program may interface with sprite trees 232 directly.

Sprite trees 232 define a list of sprites for presentation by presentation library 250 and presentation hardware 260. Sprite trees 232 may be implemented in the form of one or more suitable data structures and may also be stored on any suitable computer-readable medium.

Sprite engine 240 recursively traverses sprite trees 232 and interfaces with presentation library to 250 to control the presentation of the sprites of sprite trees 232. Sprite engine 240 may be implemented in any suitable language. Sprite engine 240 for one embodiment is implemented in C++ and runs in a separate thread.

Because application 210, functional animation library 220, and normalizer 230 construct and update sprite trees 232 at a rate slower than that at which sprite engine 240, presentation library 250, and presentation hardware 260 are able to present the sprites of sprite trees 232, sprite engine 240 performs linear interpolations for sprites between updates so as to provide for a relatively smoother presentation of animations. As one example, application 210, functional animation library 220, and normalizer 230 update sprites comprising bitmap images with positional and scale information approximately ten times per second while presentation library 250 and presentation hardware 260 display those bitmap images at video refresh rate. Sprite engine 240 therefore linearly interpolates any updates by normalizer 230 in the positional and scale information of the sprites of sprite trees 232 and updates the positional and scale information of the updated sprites in accordance with the linear interpolations at a faster rate of approximately sixty times per second so as to display the movement and scaling of bitmap images in a relatively smoother manner. Sprite engine 240 may also support fast "flip-book" animation of sequences of bitmaps with linearly interpolated indexing.

3. Animation Data Types

Fran's animation data types have been described elsewhere, such as in Elliott, Conal, and P. Hudak, "Functional Reactive Animation," *Proceedings of the 1997 ACM SIGPLAN International Conference on Functional Programming*, Amsterdam, The Netherlands, pp. 263–273 (Jun. 9–11, 1997) for example. Most of the animation-level types come from applying the Behavior type constructor to these static types, and "lifting" operations on the static types to operations on behaviors. As an illustrative example, and because it is particularly relevant to the sprite-based implementation of 2D animation, one such type is described next.

3.1 Static 2D Transforms

The Transform2 type represents 2D geometric transformation on images, points, or vectors. It also defines a type class Transformable2 containing types of 2D transformable objects.

```
module Transform2 where
class Tranformable2 a where
    (*%)       :: Transform2 ->a ->a       -- Applies a transform
identity2      :: Transform2
translate2     :: Vector2 ->Transform2
rotate2::RealVal -> Transform2
uscale2::RealVal -> Transform2    --only uniform scaling
compose2       :: Transform2 ->Transform2 ->Transform2
inverse2       :: Transform2 ->Transform2
instance Transformable2B Point2B
instance Transformable2B Vector2B
```

Intuitively, 2D transforms are mappings from 2D space to itself. Because of the restricted vocabulary above, however, one can take advantage of widely available low level rendering algorithms and hardware acceleration.

3.2 Behaviors

The type 'Behavior' is a user defined type representing time-varying values of another type where time is continuous (real-valued). Elliott, Conal, and P. Hudak, "Functional Reactive Animation," *Proceedings of the 1997 ACM SIGPLAN International Conference on Functional Programming*, Amsterdam, The Netherlands, pp. 263–273 (Jun. 9–11, 1997), for example, discusses the semantics of behaviors. A new formulation of some of the primitives are mentioned here.

($*) :: Behavior (a -> b) -> Behavior a -> Behavior b constantB :: a -> Behavior a time :: Behavior Time Semantically, these operators correspond to type-specialized versions of the classic SKI combinators.

```
-- Semantics
type Behavior a = Time -> a
type Time = RealVal
(fb $* xb)    t = (fb t) (xb t) -- S
constantB x   t = x              -- K
time          t = t              -- I
```

The name "$*" comes from the fact that it is the lifted version of function application, whose Haskell infix operator is called "$".

The lifting operators from Elliott, Conal, and P. Hudak, "Functional Reactive Animation," *Proceedings of the 1997 ACM SIGPLAN International Conference on Functional Programming*, Amsterdam, The Netherlands, pp. 263–273 (Jun. 9–11, 1997) are

```
lift0   ::   a -> Behavior a
lift1   ::   (a -> b) ->
             Behavior a -> Behavior b
lift2   ::   (a -> b -> c) ->
             Behavior a -> Behavior b -> Behavior c
-- etc
``` and are defined simply in terms of constantB and "$*", as follows.

```
lift0             = constantB
lift1 fb1         = lift0 f$* b1
lift2 fb1 b2      = lift1 fb1 $* b2
lift3 fb1 b2 b3   = lift2 fb1 b2 $* b3
-- etc
```

Note that semantically lift1 is function composition.

Thus lifting promotes an n-ary function to an n-ary function. Semantically, from the definitions above, it follows that (liftn f b1 . . . bn) t == f (b1 t) . . . (bn t)

Efficient implementation of behaviors is a rather tricky matter. Briefly, the current representation of behaviors is as a data structure that contains two aspects. The first is a structural representation intended for analysis and optimization. The second is a sampling representation, which is a lazily memoizing function from time streams to value streams. Hughes, J., "Lazy Memo Functions," *Functional Programming Languages and Computer Architecture*, J. P. Jouannaud, editor, volume 201 of *LNCS*, pp. 129–146, Springer-Verlag (September 1985), which is herein incorporated by reference, discusses lazy memo functions. The representation given here is somewhat simplified from the one used in Fran.

data Behavior a = Behavior (BStruct a) ([T] -> [a])

data BStruct a
      = ConstantB a
      | NoStructureB
      | TimeTransB (Behavior a) (Behavior Time)
      | UntilB (Behavior a) (Event (Behavior a))
      deriving Show It is not currently possible to capture the SKI structure in a Haskell datatype, because doing so would require an existential type for S (i.e., "$*") Another trick is needed for I—i.e., time. While S is too polymorphic, I is not polymorphic enough. The trick is to generalize the constructor to be polymorphic, and then define the desired specialization.

In addition to behaviors, there are some other "behavior-like" types, described by the following type class of "generalized behaviors".

class GBehavior bv where

```
untilB          :: bv -> Event bv -> bv
timeTransform   :: bv -> TimeB -> bv
condBUnOpt      :: BoolB -> bv -> bv -> bv
```

(By convention, the name of the lifted version of a type is formed by adding a "B" to the end of the unlifted type's name. Thus the types TimeB and BoolB mentioned in the GBehavior type class refer to time- and boolean-valued behaviors respectively.) These operations support reactivity, time transformation, and conditional behaviors, respectively. The last of these is an unoptimized conditional, from which the optimized conditional is defined as follows.

condB :: GBehavior bv => BoolB -> bv -> bv -> bv
    condB (Behavior (ConstantB True) _) imb _ = imb
    condB (Behavior (ConstantB False) _) _ imb' = imb'
    condB c imb imb' = condBUnOpt c imb imb'

Naturally, behaviors are in the GBehavior class.
    instance GBehavior (Behavior a) where
      condBUnOpt = lift 3 (\ a b c -> if a then b else c)

Most animated types are defined very simply, by lifting. For instance, here is the type Transform2B of animated 2D transforms.
    module Transform2B where
    import qualified Transform2 as T
    type Transform2B = Behavior T.Transform2

```
identity2   = lift0 T.identity2
translate2  = lift1 T.translate2
rotate2     = lift1 T.rotate2
uscale2     = lift1 T.uscale2
compose2    = lift2 T.compose2
inverse2    = lift1 T.inverse2
``` class Transformable2B a where
      (*%) :: Transform2B -> a -> a instance T.Transformable2 a => Transformable2B (Behavior a) where (*%) = lift2 (T.*%)

3.3 Image Animation

Fran images are spatially continuous and infinite in extent and may contain embedded sounds.

The type ImageB represents image animation. Some of the types used in the construction of ImageB values are as follows.

```
emptyImage   :: ImageB                                    -- transparent everywhere
solidImage   :: ImageB                                    -- solid color image
flipImage    :: SL.HFlipBook -> RealB -> ImageB           -- flipbook-based
renderImage  :: Rendered -> ImageB                        -- text, 2D & 3D geometry
soundImage   :: SoundB -> ImageB                          -- embedded sound
over         :: ImageB -> ImageB -> ImageB                -- overlay
withColor    :: ColorB -> ImageB -> ImageB                -- colored image
crop         :: RectB -> ImageB -> ImageB                 -- cropped image
instance Transformable2B Point2B                          -- *%
-- Maps crop rect, color, scale, angle, time transform
type Renderer = RectB -> Maybe ColorB -> RealB -> RealB
                -> TimeB -> SurfaceULB
data SurfaceUL =
     SurfaceUL  HDDSurface                                -- DirectDraw ® surface
                Point2                                    -- upper-left corner location
type SurfaceULB = Behavior SurfaceUL
```

For notational convenience, Fran also provides a few functions for directly transforming ImageB values.
    move :: Transformable2B bv => Vector2B -> bv -> bv
    move dp = (translate2 dp *%)

stretch :: Transformable2B bv => RealB -> bv -> bv
    stretch sc = (uscale2 sc *%)

turn :: Transformable2B bv => RealB -> bv -> bv
    turn angle = (rotate2 angle *%)

In Haskell, an infix operator with one argument but missing the other denotes a function that takes the missing argument and fills it in. In these definitions, the missing argument is the 2D transformable value.

Displaying an animated image also plays the sounds it contains. Spatial transformation has audible effect; the horizontal component of translation becomes left/right balance, and the scale becomes volume adjustment. Cropping silences sounds outside of the crop region.

By definition, a renderer not only has the type above, but must also have the following property:

```
(crop .rectB              $
 mbWithColor.mbColorB     $
 stretch scaleB           $
 turn angleB              $
 ('timeTransform' tt)     $
 RenderImage renderer     )
==
surfaceIm (
      renderer rectB mbColorB scaleB angleB tt)
where
-- Possibly apply a color
mbWithColor Nothing imB = imB
mbWithColor (Just c) imB = withColor c imB
-- The image contained on a drawing surface
surfaceIm :: SurfaceULB -> ImageB
```

The "$" operator is an alternative notation for function application. Because it is right-associative and has very low synthetic precedence, it is sometimes used to eliminate cascading parentheses.

For simple file-based bitmap images, there is also a simple utility that loads a named file, makes a one-page flip-book and applies flipImage:

importBitmap :: String -> ImageB

In the early implementations of Fran, ImageB was simply defined to be Behavior Image, for a type Image of static images. This representation made for a very simple implementation, but it has a fundamental problem: the image structure of an ImageB value cannot be determined at the behavior level. It must first be sampled with some time t to extract a static image, whose structure can then be examined. To display an animation then, one must repeatedly sample it, and display the resulting static images. Consequently, the display computation cannot build and maintain data structures and system resources for parts of an animation. In particular, it cannot allocate one sprite for each flipImage and renderImage, set them moving, and then update the motion paths incrementally. That is, the implementation cannot take advantage of sprite engine 240 running in a separate thread.

It appears then that the modularity imposed by lifting it requires an underlying "immediate mode," rather than "retained mode," presentation library, to borrow terms from 3D graphics programming. In designing Fran, however, the upcoming generation of graphics accelerator cards which are believed to be increasingly oriented toward retained mode were targeted. Of special interest is the sprite-based Talisman architecture as described, for example, in Torborg, Jay, and J. Kajiya, "Talisman: Commodity Real-time 3D Graphics for the PC," *SIGGRAPH 96 Conference Proceedings*, Addison Wesley, Holly Rushmeier, editor, ACM SIGGRAPH, Annual Conference Series, New Orleans, La., pp. 353–364 (Aug. 4–9, 1996). The sprite-based Talisman architecture performs transformation and overlaying of sprites with blending and high-quality anisotropic image filtering, without requiring a screen-size frame buffer.

For reasons given above, the ImageB is not represented in terms of a static Image type, but rather as its own recursively defined data type.

```
data ImageB
    = EmptyImage              -- transparent everywhere
    |SolidImage               -- solid color
    |FlipImage SL.HFlipBook   -- page # behavior
     RealB
    |RenderImage Renderer     -- text, 2D & 3D geometry
    |SoundI SoundB            -- embedded sound
    |Over ImageB ImageB       -- overlay
    |TransformI Transform2B   -- transformed
     ImageB
    |WithColorI ColorB ImageB -- colored
    |CropI RectB ImageB       -- cropped
    |CondI BoolB ImageB       -- conditional
     ImageB
    |UntilI ImageB (Event     -- "untilB"
     ImageB)
    |TimeTransI ImageB        -- timeTransform
     TimeB
    deriving Show
```

Image animations are generalized behaviors:

instance GBehavior ImageB where
   untilB = UntilI
   timeTransform = TimeTransI condBUnOpt = CondI They are also transformable. The definition below includes a simple optimization, namely transformation of the empty image. Although a programmer would not be likely to transform empty images explicitly, such compositions arise at runtime due to modular programming style, as well as some reactivity optimizations.

instance Transformable2B ImageB where
   _ *% EmptyImage = EmptyImage
   xf*% im = xf 'TransformI' im The other ImageB operators are defined similarly, applying simple optimizations or the corresponding constructor.

3.4 Sound

Fran has a fairly simple type SoundB of "animated sounds." Its building blocks are similar to those of ImageB.

```
module SoundB where
   silence      :: SoundB
   importWave   :: String -> BoolI ->    -- file name, repeat?
                   SoundB
   mix          :: SoundB -> SoundB ->
                   SoundB
   volume::     RealB -> SoundB -> SoundB
   pitch        :: RealB -> SoundB -> SoundB
   pan          :: RealB -> SoundB -> SoundB
```

Representation of SoundB via lifting is problematic both conceptually and pragmatically. Conceptually, it is unclear what is a useful and implementable notion of static sound. Pragmatically, as with ImageB, a lifting-based implementation would require an immediate mode presentation library, but known libraries such as DirectSound® by Microsoft® Corporation are retained mode. See, e.g., Microsoft® Corporation and Peter Donnelly, *Inside DirectX®*, Microsoft Press® (1998), which is herein incorporated by reference. DirectSound® provides interfaces to allocate sound buffers in either main memory, such as RAM 125 of FIG. 1, or the memory of audio adapter 158, for example, and direct the sound buffers to be mixed and played. The client program can then optionally adjust the sound buffers' volume, frequency, and left/right balance attributes. A retained mode architecture is especially desirable for sound, because it is difficult for an application program to keep the hardware's sound buffers filled and perform or direct mixing and output in a timely enough fashion to avoid buffer overflow or underflow, both of which have easily discernible effects. A lazy functional program would have particular difficulty because of unpredictable interruptions due to garbage collection and evaluation of postponed computations. Direct-Sound® creates a few highest-priority threads that feed buffers and adjust registers in the sound hardware.

The representation of SoundB is as a recursive data type.

```
data SoundB = SilentS
    |BufferS SL.HDSBuffer Bool   -- for importWave
    |MixS SoundB SoundB
    |VolumeS RealB SoundB
    |PanS RealB SoundB
    |PitchS RealB SoundB
    |UntilS SoundB (Event SoundB)
    |TimeTransS SoundB TimeB
    deriving Show
```

Animated sounds are generalized behaviors as well. Conditional is implemented by mixing two sounds with applied volumes that silence one or the other, depending on the boolean behavior. (With—blending for transparency, an analogous implementation of conditional image animations would be possible. Alternatively, one could use stretch.)

```
instance GBehavior SoundB where
    untilB = UntilS
    timeTransform = TimeTransS
    condBUnOpt c snd snd' =
        volume v snd 'mix' volume v' snd'
        where
            v = condB c 1 0
            v' = 1 - v
```

3.5 3D Animation

Many 3D graphics presentations libraries also have a retained-mode structure, e.g., Inventor by Silicon Graphics, Inc. as described, for example, in Strauss, Paul S. and R. Carey, "An Object-Oriented 3D Graphics Toolkit," *Computer Graphics*, Vol. 26, No. 2, pp. 341–349 (July 1992), and Performer by Silicon Graphics, Inc. as described, for example, in Rohlf and J. Helman, "IRIS Performer: A High Performance Multiprocessing Toolkit for Real-Time 3D Graphics," Proceedings of SIGGRAPH '94, ACM Press, Andrew Glassner, editor, Computer Graphics Proceedings, Annual Conference Series, Orlando, Fla., pp. 381–395 (Jul. 24–29, 1994), and Direct3DRM by Microsoft® Corporation as described, for example, in Glidden, Rob, *Graphics Programming With Direct3D®: Techniques and Concepts*, Addison-Wesley (1996). Fran for one embodiment uses Direct3DRM to display its type GeometryB of animated 3D geometry. Its structure is much like ImageB and SoundB.

4. Sprite Engine 240

The primary purpose of sprite engine 240 is to scale, move, and overlay a sequence of images, and to do so at a very high and regular rate near video refresh rate. Because animations may involve arbitrarily complex behaviors and because garbage collection and lazy evaluation cause unpredictable delays, this goal could not be met if the window refresh were implemented in Haskell or even invoked by a Haskell program. For these reasons, sprite engine 240 for one embodiment is implemented in C++, does no memory allocation, and runs in its own thread. Sprite engine 240 for one embodiment is implemented with the C++ programming language.

4.1 Sprites and Sprite Trees

Sprite engine 240 maintains an ordered collection of sprites, represented for one embodiment via a C++ class hierarchy. Exemplary classes representing individual sprites are as follows.

FlipSprite has a bitmap that is selected from a "flip book" object. Each flip book contains a pointer to a bitmap (e.g., a DirectDraw® surface) stored in video memory, and information describing a rectangular array of images contained somewhere within the images. This array is taken to be a linear sequence of consecutive "pages". Flip books and the images to which they refer are immutable and may be shared among any number of flip sprites. The current page number, spatial transform, and cropping rectangle are all stored in the unshared sprites rather than the shared flip book.

RenderedSprite has its own drawing surface and a method for replacing the surface with a new one. This sprite is used for all "rendered" images, such as text, 2D geometry, and 3D geometry viewed through a camera.

SolidSprite is a uniformly colored sprite, cropped but not spatially transformed.

SoundSprite is an embedded sound, and is neither cropped nor transformed. It contains a DirectSound® "duplicate" sound buffer and volume, frequency, and left/right balance attributes. A duplicate buffer is a DirectSound® object that contains a pointer to (typically immutable) shareable sound data, plus its own unshared attributes for volume, frequency, and left/right balance.

A displayed animation could be represented by a list of individual sprites, in back-to-front order, so that upper (later) sprites end up painted over lower (earlier) sprites. This representation is the simplest for display, but is awkward for editing. When an event occurs in an animation, an animated object may be introduced, removed, or replaced. Since the appearance of such a component may contain any number of image and sound sprites, the event may introduce, remove, or replace a whole contiguous subsequence of sprites.

Figure 3:
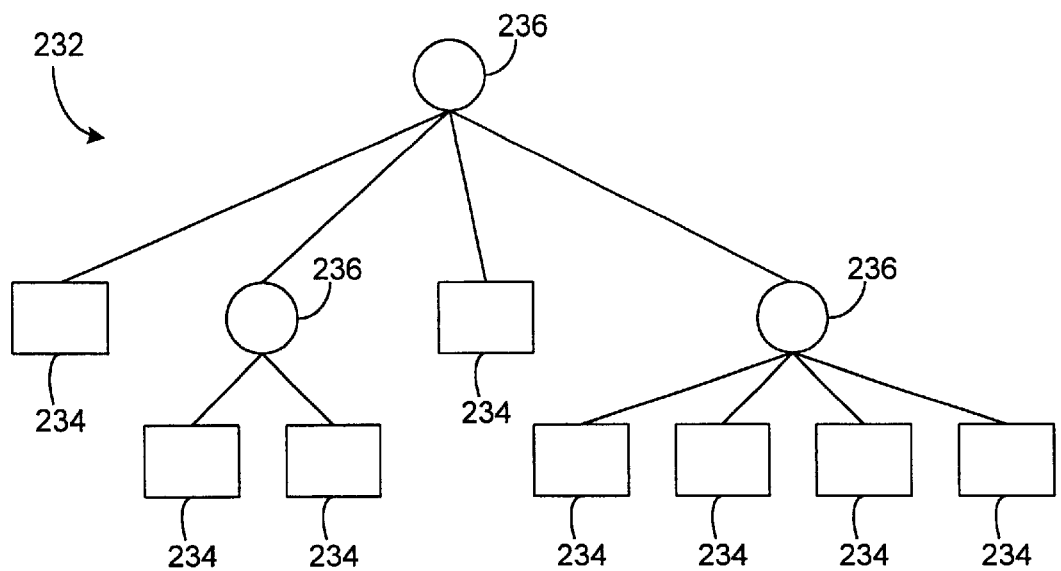
FIG. 3 illustrates, for one embodiment, a list of sprite trees.

Sprite engine 240 makes it easy and fast to edit the sprite list at a conceptual level by using a list of sprite trees 232, as illustrated in FIG. 3, rather than a list of individual sprites. The list of sprite trees 232 comprise leaf nodes 234 and edit nodes 236. Leaf nodes 234 each correspond to an individual sprite. Edit nodes 236 each correspond to one or more related sprites as represented by any leaf nodes 234 or edit nodes 236 emanating from the edit node 236. Edit nodes 236 correspond exactly to the points of structural (as opposed to parametric) mutability of the animation being displayed. (For Fran's use, the points of mutability are generated from the reactivity construct "untilB") Correspondingly, there is a SpriteTree subclass SpriteGroup that contains a list of sprite trees and supports a method to replace the list, in its entirety, with another one. Sprite engine 240 for one embodiment requires that there be no structure sharing, so the old list and all of its elements are recursively deallocated. Lack of sharing also allows direct linking of sprite trees. Each sprite tree contains a next pointer.

For conditional animations, such as generated by Fran's "condB", there is a SpriteTree subclass CondSpriteTree, which contains an externally mutable boolean and two sprite tree lists.

Sprite engine 240 expects sprite trees 232 to be updated less often than they are redrawn. For example, Fran tries to sample behaviors at roughly ten times per second and sends updates to sprite engine 240. Between updates, sprite engine 240 performs linear interpolation of all sprite attributes, which are actually represented as linear functions rather than constant values. For smoothness, updates must then be given for times in the future, so that the a new linear path may be set from the current time and value to the given one. These linear behaviors form a compromise between arbitrary behaviors, which have unpredictable sampling requirements, and mere constant values, which fail to provide smooth motion. Other possible compromises include quadratic and cubic curves, for which fast incremental sampling algorithms may be used.

Figure 4:
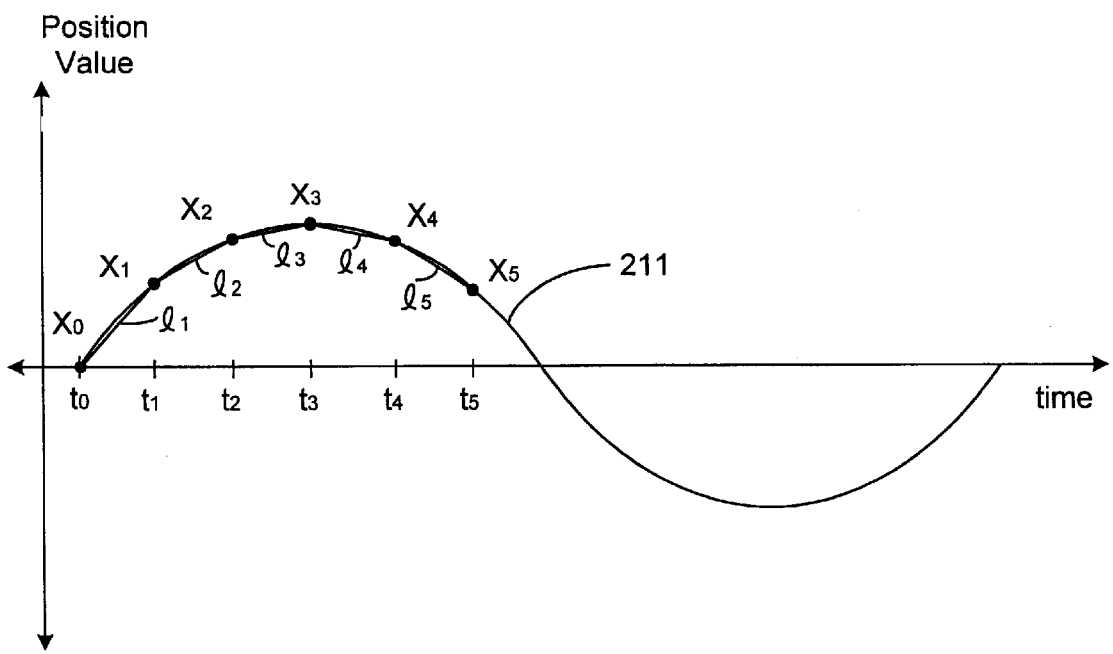
FIG. 4 illustrates a representation of an animated number.

As one example with reference to FIG. 4, application 210 specifies the animation of a point moving along a sine curve path 211. At time $t_0$, the position value of the sprite for the point is updated to $x_0$ by normalizer 230. At time $t_1$ or approximately one-tenth of a second after time $t_0$, the position value of the sprite for the point is updated to $x_1$ by normalizer 230. At time $t_2$ or approximately one-tenth of a second after time $t_1$, the position value of the sprite for the point is updated to $x_2$ by normalizer 230. Normalizer 230 similarly updates the position value of the sprite for the point at times $t_3, t_4, t_5$. Rather than presenting the movement of the point at each position value $x_0, X_1, X_2, X_3, \ldots$ sprite engine 240 linearly interpolates the position value of the sprite for the point at each approximately one-sixtieth of a second interval between each pair of update times $t_0, t_1, t_2, t_3, \ldots$ and accordingly updates the position value of the sprite every approximately one-sixtieth of a second to present a relatively smoother movement of the point by presentation library 250 and presentation hardware 260.

In performing the linear interpolation of the position value of the sprite for the point between update times $t_0$ and $t_1$, for example, sprite engine 240 determines each linearly interpolated position value x as $x=x_0+(t-t_0)*rate$, where $rate=(x_1-x_0)/(t_1-t_0)$ and t is the time at which the sprite for the point is to be presented with the new linearly interpolated position value x. The time t is incremented in approximately one-sixtieth of a second intervals. The linearly interpolated position values are illustrated in FIG. 4 as linear paths $l_1, l_2, l_3, \ldots$ The main loop of sprite engine 240 is then to traverse sprite tree list 232 recursively and in depth-first, back-to-front order. Each image sprite in turn is told to paint itself, and in doing so samples its attributes' linear functions and then does a very fast "blit" (copy). Sound sprites are "painted" by updating the DirectSound ® buffer attributes. Updating is double buffered to avoid visible image tearing. Thus the blitting is done to a "back buffer", which is a video memory surface being the same size as the display window. When all of the sprites have been painted, the back buffer is blitted to the front (visible) buffer. Given a modern video card with adequate video RAM and hardware stretching, these operations are extremely fast.

4.2 Interpretation of Sprite Trees

The goal of ImageB display is first to "spritify", i.e., convert an abstract ImageB value to a initial list of sprite trees 232 and then update the trees iteratively. Concurrently, sprite engine 240 traverses and displays sprite trees 232. Sprite trees 232 for one embodiment are implemented in C++, yet for the purpose of exposition are expressed as the following Haskell type definitions.

type SpriteTrees = SpriteTree]

```
data SpriteTree =
    SoundSprite      RealB              -- volume adjust
                     RealB              -- left/right pan
                     RealB              -- pitch adjust
                     Bool               -- whether to auto-repeat
                     SL.SoundBuffer
  | RenderedSprite   VectorB            -- translation vector
                     SurfaceULB
  | SolidSprite      RectB              -- cropping region
                     ColorB             -- solid color
  | FlipSprite       RectB
                     VectorB            -- translation vector
                     RealB              -- scale factor
                     SL.HFlipBook
                     RealB              -- page number
  |UntilBT           SpriteTrees (Event Sprite Trees)
  |CondT             BoolB Sprite Trees Sprite Trees
data TransforrnableSprite =
```

In order to define "correct" conversion, an interpretation of sprite tree lists is needed. This interpretation may be specified by mapping sprite tree lists to ImageB values. Note that this mapping is hypothetical, serving to (a) specify what sprite engine 240 does, and (b) justify the implementation in Section 5 of the reverse mapping, i.e., from ImageB values to sprite tree lists.

Note that SpriteTrees type almost fits the GBehavior style, but not quite. Instead, it matches the data structure of sprite engine 240.

The interpretation functions are as follows.

treesIm :: SpriteTrees -> ImageB treesIm [ ] = emptyImage
treesIm (bot : above) = treesIm above 'above' treeIm bot treeIm :: SpriteTree -> ImageB
treeIm (SoundSprite soundB) = soundImage soundB treeIm (RenderedSprite motionB surfaceB) =
    move motion (surfaceIm surfaceB)
treeIm (SolidSprite rectB colorB) =
    crop rectB (withColor colorB solidImage)

```
treeIm (FlipSprite rectB motionB scaleB book pageB) =
    crop rectB       $
    move motB        $
    stretch scaleB   $
    flipImage book pageB
``` treeIm (trees 'UntilBT' e) =
    treesIm treesIm 'untilB' e ==> treesIm treeIm (CondT c trees trees') =
    condB c (treesIm trees) (treesIm trees')

The function treesIm is the main interpretation function, and says that a list of sprite trees 232 represents an overlay of the images represented by the member trees, in reverse order. This reversal reflects the fact that the sprite tree lists 232 are in back-to-front order so that sprite engine 240 can paint sprite trees 232 in list order. Later (upper) sprite trees are then painted over earlier (lower) sprite trees.

The first four clauses of the treeIm function interpret individual sprites. Note the rigidity of order of applied operations imposed by the sprite constructors, as contrasted with the flexibility afforded by the ImageB type from Section 3.3.

The UntilBT case says that a reactive sprite tree represents a reactive image animation. This animation is initially the one represented by the initial sprite tree. When the event occurs, yielding a new sprite tree list, the animation switches to the one represented by these new sprite trees. The conditional case is similar.

5. From Abstract Animations to Sprite Trees

The interpretation of sprite tree lists as image animations given above helps to specify the reverse process, which is implemented by normalizer 230 so that sprite engine 240 may be used to display animations. This algorithm works by recursive traversal of ImageB values, accumulating operations that are found out of order. The type and specification are as follows.

spritify :: SpriteTrees -> RectB -> Maybe ColorB -> Transform2B
    -> TimeB -> ImageB -> SpriteTrees

```
treesIm (spritify above rectB mbColorB xfB tt imB) ==
    treesIm above 'above'
    (crop rectB                $
    mbWithColor mbColorB       $
    (xfB *%)                   $
    ('timeTransform' tt)       $
    imB)
```

That the algorithm given below satisfies this specification may be proved by induction on the ImageB representation. Rather than give the algorithm first and then the proof, the algorithm is instead derived from the specification so that it is correct by construction. Many simple algebraic properties of the data types are relied upon. These properties may be taken as axioms or proved from semantic models of the data types.

Normalizer 230 for one embodiment is implemented with the Haskell source code.

5.1 Solid Images

Consider the following facts about solid images.

SolidImage 'timeTransform' tt == SolidImage xfB *% SolidImage == SolidImage withColor defaultColor SolidImage = SolidImage These facts simplify the specification of spritify:

treesIm (spritify above rectB mbColorB xfB tt SolidImage) ==
treesIm above 'over'
crop rectB (withColor (chooseColorB mbColorB) SolidImage)

where chooseColorB :: Maybe ColorB -> ColorB
chooseColorB Nothing = defaultColor
chooseColorB (Just c) = c Now considering the interpretation of SolidSprite, the specification simplifies further:

treesIm (spritify above rectB mbColorB xfB tt SolidImage) ==
treesIm above 'above'
treeIm (SolidSprite rectB (chooseColorB mbColorB))

Finally, recall from the definition of treesIm that treesIm (bot : above) == treesIm above 'over' treeIm bot The specification then becomes treesIm (spritify above rectB mbColorB xfB tt SolidImage) ==
treesIm (SolidSprite rectB (chooseColorB mbColorB) : above)

This final simplification then directly justifies the SolidImage case in the spritify algorithm.

spritify above rectB mbColorB xfB tt SolidImage = SolidSprite rectB (chooseColorB mbColorB) : above 5.2 Rendered Images Because of their spatially continuous nature, ImageB values may be thought of as being constructed bottom-up, whereas their implementation via spritify is top-down. This difference is especially clear in the treatment of rendered images.

Although sprite engine 240 can perform scaling as well as translation, the scaling it does is necessarily approximate, i.e., it scales discrete images. With a rendered image, however, the rendering operation itself should produce a discrete image of the appropriate resolution. For this reason, the transform behavior should be factored into translation, scale, and rotation. Fran's factorTransform2 function does just this:

xfB == translate motionB 'compose2'
uscale scaleB 'compose2' rotate angleB where (motionB, scaleB, angleB) = factorTransform2 xfB

Moreover, the meaning of transform composition is function composition:

(xfB 'compose2' xfB') *% thing == xfB *% (xfB' *% thing)

Factoring the spatial transform and turning transform composition into function composition, the specification becomes the following.

| treesIm (spritify above rectB mbColorB xfB tt (RenderImage renderer)) == |  |
|---|---|
| treesIm above 'above' |  |
| (crop rectB | $ |
| mbWithColor colorB | $ |
| move motionB | $ |
| stretch scaleB | $ |
| turn angleB | $ |
| ('timeTransform' tt) | $ |
| RenderImage renderer) |  | where (motionB, scaleB, angleB) = factorTransform2 xfB

Next, since renderers do not perform motion, the move must be extracted from within applications of withColor and crop, as justified by the following properties.

withColor c (xfb *% imb) == xfb *% (withColor c imb)

crop rectB (xfb *% imb) == xfb *% crop (inverse2 xfb *% rectB) imb

The definition of a renderer in Section 3.3 then leads to the following rule for spritifying rendered images.

spritify above rectB mbColorB xfB tt (RenderImage renderer) ==
RenderedSprite motionB
(renderer (move (-motionB) rectB)
mbColorB scaleB angleB tt)
above where (motionB, scaleB, angleB) = factorTransform2 xfB 5.3 Flip-book Animation A similar analysis to the one for SolidImage above applies to flip book animation. Fran imposes two restrictions on flip-book animations (and the special case of constant bitmaps). First, they may not be colored, and second, they may not be rotated. Simplifying the spritify specification under these assumptions yields the following.

| treesIm (spritify above rectB Nothing xfB tt (FlipImage book pageB)) == |  |
|---|---|
| treesIm above 'above' |  |
| (crop rectB |  |
| mbWithcolor Nothing | $ |
| move motionB | $ |
| stretch scaleB | $ |
| turn (constantB 0) | $ |
| ('timeTransform' tt) | $ |
| FlipImage book pageB) |  | where (motionB, scaleB, constantB 0) = factorTransform2 xfB

The spritify specification can be simplified further, using the following facts.

mbWithColor Nothing imb == imb turn (constantB 0) imb == imb
(flipImage book pageB) 'timeTransform' tt ==
flipImage book (pageB 'timeTransform' tt)

After applying these properties, the specification matches the interpretation of FlipSprite, resulting in the following rule for flipImage.

spritify above rectB _ xfB tt (FlipImage book pageB) =
      FlipSprite rectB motionB scaleB
        book (pageB 'timeTransform' tt)
      : above
    where
      (motionB, scaleB, _) = factorTransform2 xfB

5.4 The Empty Image

The empty image is trivially spritified, because (a) time transformation, space transformation, coloring, and cropping all map the empty image to itself, and (b) the empty image is the identity for over.

spritify above _____ EmptyImage = above

5.5 Overlays

The treatment of overlays follows from the distribution of time transformation, space transformation, coloring, and cropping over the over operation, plus the associativity of over.

spritify above rectB mbColor xfB tt (top 'Over' bot) =
      spritify above' rectB mbColor xfB tt bot
    where
      above' = spritify above rectB mbColor xfB tt top

5.6 Time Transformation

Spritifying a time transformed animation is relatively simple because of the following composition property.

(imb 'timeTransform' tt') 'timeTransform' tt ==
    imb 'timeTransform' (tt' 'timeTransform' tt) ==

Thus:

spritify above rectB mbColor xfB tt (TimeTransI imb tt')
    =
      spritify above rectB mbColor xfB (tt' 'timeTransform' tt) imb

5.7 Space Transformation

Space and time transformation do not commute, but the following property holds.

(xfB *% imb) 'timeTransform' tt ==
    (xfB 'timeTransform' tt) *% (imb 'timeTransform' tt)

Space transforms compose:

xfB *% (xfB' *% imB) == (xfB 'compose2' xfB') *% imB

The rule for TransformI then follows easily.

spritify above rectB mbColor xfB tt (xfB' 'TransformI' imb) =
      spritify above rectB mbColor tt
        (xfB 'compose2' (xfB' 'timeTransform' tt))

5.8 Coloring

The treatment of withColor follows from the following commutativity-like properties and combination rule. (Note that in the case of nested colorings, the outer ones win, in contrast to many graphics libraries. The reason is that the informal model of coloring is to simply paint over what is already present. The conventional, innermost-wins policy is simpler to implement, but has arguably more complex semantics.)

(withColor c imb) 'timeTransform' tt ==
    withColor (c 'timeTransform' tt) (imb 'timeTransform' tt)

xf *% withColor c imb == withColor c (xf *% imb)

withColor c (withColor c' imb) == withColor c imb

Then spritify above rectB mbColor xfB tt (withColor color' imb) =
      spritify above rectB mbColor" xfB tt imb
    where
      mbColor"= mbColor ++ Just (color' 'timeTransform' tt))

The Haskell operation "++" on Maybe is defined as follows.

Nothing ++ mb = mb
    Just x ++ _ = Just x

5.9 Cropping

Cropping works very much like space transformation and coloring, justified by analogous properties.

(crop rectB imb) 'timeTransform' tt ==
    crop (rectB 'timeTransform' tt) (imb 'timeTransform' tt)

xf *% crop rectB imb == crop (xf *% rectB) (xf *% imb)

crop rectB (crop rectB' imb) ==
    crop (rectB 'intersectRect' rectB') imb

Then spritify above rectB mbColor xfB tt (CropI rectB' imb) =
      spritify above rectB" mbColor xfB tt imb where

```
rectB" = (rectB 'intersectRect')    $
         (xfB *%)                   $
         ('timeTransform' tt)       $
         rectB'
```

5.10 Conditional Animation

The rule for spritifying a conditional animation relies on several distributive properties.

(condB boolB thenB elseB) 'timeTransform' tt
    == condB
      (boolB 'timeTransform' tt)
      (thenB 'timeTransform' tt)
      (elseB 'timeTransform' tt)

xf *% (condB boolB thenB elseB)
    == condB boolB (xf *% thenB) (xf *% elseB)

withColor c (condB boolB thenB elseB)
    == condB boolB (withColor c thenB) (withColor c elseB)

crop rectB (condB boolB thenB elseB)
    == condB boolB (crop rectB thenB) (crop rectB elseB)

The rule:

spritify above rectB mbColor xfB tt (CondI c imb imb')
=
CondT c
  (spritify [ ] rectB mbColor xfB tt imb)
  (spritify [ ] rectB mbColor xfB tt' imb)

: above

The animations imb and imb' are spritified with an empty above list, and the whole conditional sprite tree is placed under the given above sprites. Alternatively, the animations imb and imb' may be spritified each with the given above list, and a singleton CondT sprite tree list may be made. The implementation above preserves the invariant that sprite tree structure is never shared (Section 4.1).

5.11 Reactive Animation

Reactive animations are spritified in much the same way as conditional animations, justified by analogous properties. The rule:

spritify above rectB mbColor xfB tt (imb 'UntilI' e) =
  UntilBT (spritify [ ] rectB mbColor xfB tt imb)
    (e 'afterE' (rectB, mbColor, xfB, tt) ==>
    \ (imb', (rectB', mbColor', xfB', tt')) ->
      spritify [ ] rectB' mbColor' xfB' tt' imb')
  above The afterE combinator gives access to the "residual", or "aged" version, of a value of a GBehavior type upon the occurrence of an event. Using the unaged behaviors instead would cause a time-space leak, since the behaviors would be held onto from their beginning while waiting for the event to occur.

5.12 Embedded Sound

Image-embedded sounds are spritified by generating a collection of sound sprites. In Fran, the pan (left/right balance), and the volume are influenced by the spatial transform being applied. If the sound's location is outside of the cropping rectangle then it is silenced. (The operator "+^" is point/vector addition.)

spritify above rectB __ xfB tt (SoundI sound) =
  spritifySoundB above vol pan pitch tt sound
  where
    (motion, scale, _) = factorTransform2 xfB
    - - Pan based on x coordinate. The 7.0 is empirical.
    pan = 7.0 * fst (vector2XYCoords motion)
    -- Volume is based on scale, possibly silenced by cropping
    vol = ifB
      (rectContains rectB (origin2 +^ motion))
      (abs scale) 0
    pitch =1

The new sound conversion function spritifySoundB is specified and implemented much like spritifying image animations. The specification:

spritifySoundB :: SpriteTrees -> RealB -> RealB -> RealB -> TimeB -> SoundB -> SpriteTrees

```
treesIm (spritify SoundB above volB panB pitchB tt sound) ==
    treesIm above 'above'
    soundImage (
        volume volB        $
        pan panB           $
```

-continued

```
        pitch pitchB       $
        ('timeTransform' tt) $
        sound)
```

The following implementation is somewhat simpler than that of spritify, because of the independence of the operations for adjusting pan, volume, and pitch.

spritifySoundB above ___ SilentS = above spritifySoundB above volB panB pitchB tt (BufferS buff repeat) =
  SoundSprite volB panB pitchB repeat buff : above spritifySoundB above volB panB pitchB tt (sound 'MixS' sound') =
  spritifySoundB above' volB panB pitchB tt sound'
  where
    above' = spritifySoundB above volB panB pitchB tt sound spritifySoundB above volB panB pitchB tt (sound 'TimeTransS' tt') =
  spritifySoundB above volB panB pitchB (tt' 'timeTransform' tt) sound spritifySoundB above volB panB pitchB tt (VolumeS v sound) =
  spritifySoundB above (volB * v 'timeTransform' tt) panB pitchB tt sound spritifySoundB above volB panB pitchB tt (PanS p sound) =
  spritifySoundB above volB
    (panB + timeTransform p tt)
    pitchB tt sound spritifySoundB above volB panB pitchB tt (PitchS p sound) =
  spritifySoundB above volB panB
    (pitchB * p 'timeTransform' tt)
    tt sound spritifySoundB above volB panB pitchB tt (sound 'UntilS' e) =
  UntilBT (spritifySoundB [ ] volB panB pitchB tt sound)
    (e 'afterE' (volB, panB, pitchB, tt) ==>
    \ (sound', (volB', panB', pitchB', tt')) ->
      spritifySoundB [ ] volB' panB' pitchB' tt' sound')
  : above

5.13 State and Concurrent Updating

The spritifying algorithms above are idealized in that they construct immutable sprite tree lists containing Fran behaviors. In fact, the sprite engine's data structures are mutable, both parametrically and structurally, and only accommodate linear behaviors. The implementation of spritify and spritifySound create the mutable sprite trees with initial constant parameters for position, scale, pitch, etc., and then iteratively update these parameters, while the sprite engine runs concurrently. For simplicity of implementation, every active sprite is managed by its own Haskell thread, using the Concurrent Haskell primitives as described, for example, in Jones, Simon Peyton, and A. Gordon and S. Finne, "Concurrent Haskell," *Conference Record of POPL '96: The 23rd ACM SIGPLAN-SIGACT Symposium on Principles of Programming Languages*, St. Petersburg Beach, Fla., pp. 295–308 (Jan. 21–24, 1996). Each such thread is fueled by a request channel, each of which says either to continue or to quit, and puts status messages into a response channel. Each sprite thread iteratively samples the appropriate behaviors (slightly into the future) and invokes an update method on the sprite object. In response, the sprite engine charts a new linear course for each parameter.

The handling of a reactive image animation, imb 'untilB' e, is somewhat tricky. The initial animation imb is spritified, starting any number of (Haskell) threads. The resulting sprite tree list is wrapped up in a SpriteGroup object (corresponding to the UntilBT constructor in the Haskell type definition). One more thread runs to watch for event occurrences and causes the update work corresponding to imb to continue until the first occurrence of the event e, and then to stop. At that point, a new animation is available and is spritified, generating a new sprite tree list, which is then passed to a method on the SpriteGroup object that recursively deletes its old list and installs the new one. The number of running threads thus varies in response to events. Because every thread has accompanying overhead for controlling its work, a useful optimization would be to create many fewer threads.

EXAMPLE #1{tc "Example #1"\1 5 }

Figure 5:
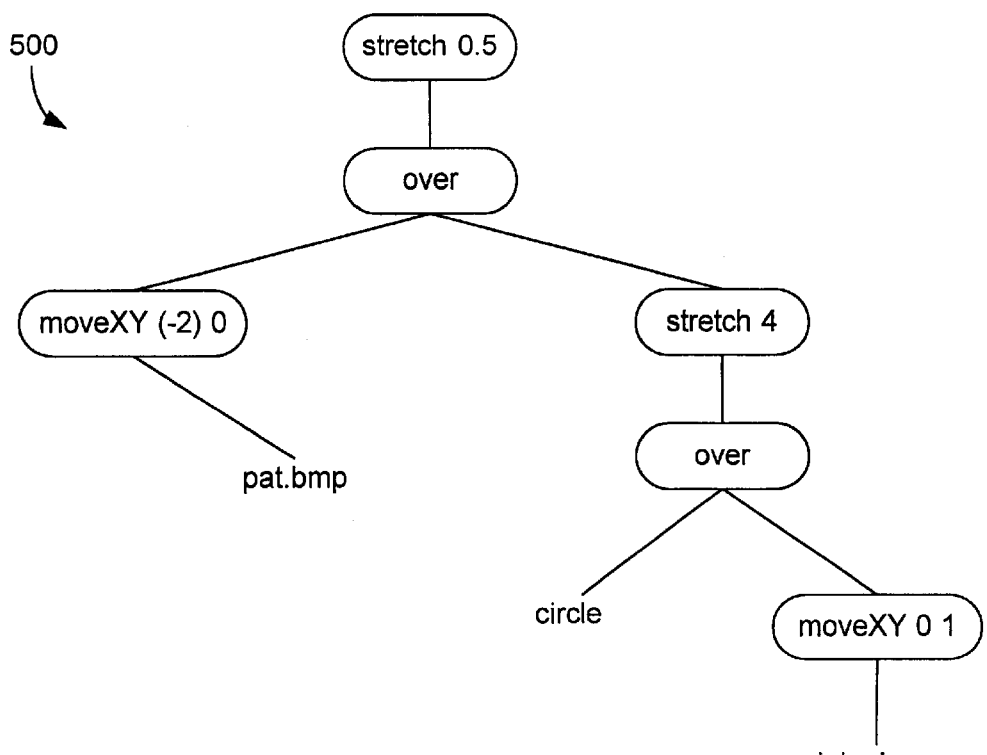
FIG. 5 illustrates exemplary functional animation data types.
Figure 6:
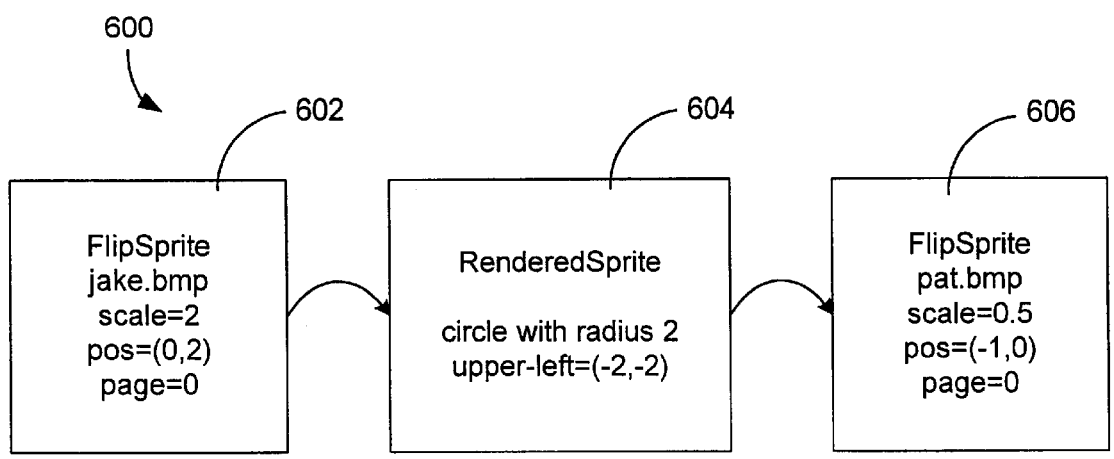
FIG. 6 illustrates exemplary sprites constructed from the data types of FIG. 5.

As one example where application 210 contains the following Haskell source code supported by Fran:

pat = importBitmap "pat.bmp"
jake = importBitmap "jake.bmp"

anim=
  stretch 0.5 (
  moveXY (−2) 0 pat 'over'
  stretch 4 (
    circle 'over' moveXY 0 1 jake)
and functional animation data types 222 therefore comprise data types 500 as illustrated in FIG. 5, normalizer 230 constructs a sprite tree list 600 having three sprite trees 602, 604, 606 as illustrated in FIG. 6 based on data types 500, noting circle with radius 2 refers to a rendered image. Normalizing data types 500 can be thought of as turning anim into the following equivalent image:

norm =
moveXY (−1) 0 (stretch 0.5 pat) 'over'
  moveXY 0 0 (stretch 2 circle) 'over'
  moveXY 0 2 (stretch 2 jake)

to construct the sprite tree list 600.

Provisional application serial No. 60/093,487 includes a Haskell source code listing (Appendix K) that implements the normalizer 230. The listing of Appendix K is incorporated herein by reference. The process of converting an animation representation to a sprite tree list such as the list of FIG. 6 converts the arbitrary composition of image and sound constructors into a normal form which can be viewed as being in 'sprite normal form'. The normalizer 230 exploits the algebraic properties of the image and sound algebras to make the conversion to a sprite tree list 600.

The normalizer is implemented as a number of case statement-like functions that evaluate correct Fran based animations. The normalizer checks against each of a series of 'spritifyImageB' function implementations. The result of a match between the form of the function can produce either of two results. If the matching spritifyImageB function is on a solidimage, for example, the spritifyImageB function produces a sprite tree (in this instance of one node) and adds that sprite tree to the head of a list of such sprite trees. This is an instance where the spritifyImageB function produces a terminal sprite tree.

An alternative result of the matching of one of the multiple number of spritifyImageB is a recursive call to spritifyImageB. The example Fran statement "anim = stretch 0.5 (moveXY (−2) 0 pat 'over' stretch 4 (circle 'over' moveXY 0 1 jake))" results in such a recursive call. One of the spritifyImageB implementations from Appendix K is listed below:

spritifyImageB rectB mbColor xfB (TransformI xfB' imb) mbTT t0 =
    spritifyImageB rectB mbColor (xfB 'compose2' mbT-Trans xfB' mbTT)
    Imb mbTT t0.

The lowercase items rectB mbColor and xfB correspond to variables so that in attempting to match the Fran statement "anim = . . . (above)" the normalizer sees the statement to the left of the equal sign as:

spritifyImageB windowrect nothing identity2 (stretch 0.5 . . . ) t0. When the user requests a display of the animation, the display operation invokes spritifyImageB and in doing so provides all arguments to spritifyImageB. The rectB argument is the display window's rectangle. The mbColor is nothing (denoting that no color has been applied) and the xfB argument is identity2 (denoting no transform has been applied). The fourth argument is anim itself The mbTT is nothing, denoting no time transform has been applied and the argument t0 is the current time. This results in the recursive call to the spritifyImageB function defined by the matching function. As noted previously, the recursive calls continue until a terminal spritifyImageB match is identified. Such a terminal match causes the normalizer 230 to produce a sprite tree (possibly having only one sprite such as a flip sprite) and add that sprite tree to the list of such sprite trees maintained by the normalizer. The recursive traversal of the spritifyImageB functions causes the first sprites of the list of sprite trees to be painted first by the sprite tree engine and the later sprite of the sprite tree list to be 'painted' later so that for example, the flipsprite 'pat.bmp' of the flipsprite 606 (FIG. 6) will be painted after the bitmapped image jake.bmp of the flipsprite 602. The process of updating the sprite tree list occurs in its own operating system thread and as noted above it occurs at a rate slower than the rate at which the sprite tree engine converts the list 600 into an image.

It is noted that sound is also handled by the normalizer 230 since there is a spritify function implemented for sound and the sound and images are contained on a resultant sprite tree list so that when the sprite tree engine encounters a sound sprite the rendering hardware for emitting a sound is properly activated.

The Fran application that is interpreted by the normalizer 230 typically does not produce only one sprite. The typical animation is more likely a sequence of sprites (for various body parts, vehicles, tools etc). When a significant event occurs in the application (possibly in response to a mouse click or movement) editing of the sprite tree lists are required. Sprite sub-sequences (referred to as spritegroups) corresponding to an application object need to be inserted or removed from the sprite tree list. If the multiple sprites were organized as a linear representation of the sprite collection of the objects, the normalizer would have to perform an insertion or deletion at an arbitrary location of the sequence or to find the start and end points of a sprite subsequence to delete. This information is difficult to keep track of since the objects of the list change in response to activity by animation objects whose sprites exist in the list.

The exemplary normalizer 230 implements the sprite tree lists in a way that makes it relatively easier to perform editing of the lists. Certain of the cases of the spritify function build sprite trees with internal nodes representing points of structural mutability of the animation being presented. Such a point of mutability serves as an anchor for a sprite tree list. The normalizer may (depending on events that may occur) replace the list anchored at this point of mutability with another such list as needed. A contiguous subsequence of sprites for an animated object may therefore be introduced, removed, or replaced without the necessity of reconstructing the entire list. The spritify function on an imageB data type that implements this structure is the case including the 'until' Fran Construct.

From appendix K of the provisional application this construct is:

spritifyImageB rectB mbColor xfB (imb1 'UntilI' e) mbTT t0 =
   spritifyUntilB (\ (rectB,mbC,xfB) imb1 -> spritifyImageB rectB mbC xfC xfB imb1)
   (rectB, mbColor, xfB) imb1 e mbTT t0

This statement creates two sprite tree lists, one to send to the sprite tree list created by the normalizer before the event e and a second sprite tree list to sent to the sprite tree list created by the normalizer after the event e.

EXAMPLE #2{tc "Example #2"\1 5}

A second example useful for describing the animation process of the invention is an animation that displays a bitmapped image (obtained from a suitable source such as a file on a computer disk) moving along a path of circular motion on the video monitor 147. Four appendices (A–C, F) contained in provisional application serial No. 60/093,487 that are incorporated herein by reference contain source code for implementing an exemplary embodiment of the sprite engine. Those listings contain copyrighted material owned by the assignee of the present invention. Reference is also made to the Dr. Dobbs article incorporated by reference in this application which describes use of the functional programming language FRAN to define circular motion as well as other functions which can be combined to define more complex animations.

Listing 1

The Fran code for circular motion:
moveXY waggle wiggle (importBitmap "pat.bmp"), where
wiggle = sin (pi * time); and
waggle = cos (pi * time).

Recall that one goal of the invention is to convert this functional animation program that defines the animation into data that can understood by the rendering hardware such as the video adapter 148 and audio adapter 158 of FIG. 1.

The normalizer 230 runs at a rate appreciably slower than the sprite engine 240. It transforms the simple FRAN program of listing 1 through a series of conversions into a form suitable for interpretation by the sprite engine. First expand the definitions of moveXY and importBitmap:

v = vector2xy waggle wiggle
Im1 = TransformI (Translate2v) (FlipImage patBook)
Then:
Spritify[ ] windowRect nothing identity2 im1
=> Spritify[ ] windowRect nothing (Translate2 v) (FlipImage patBook 0)
=>[ FlipSprite windowRect v 1 ( patBook 0) ]

For the case of circular motion of a single bitmapped image, the normalizer 230 constructs a sprite tree that includes a single instance of the flipsprite class with only window cropping, circular motion (translation) and a scale of 1. There are no overlays so there is only a single sprite tree and since there is only one image, the flipsprite has a single page. In many animations, however, there will be a linked list of sprite trees having multiple nodes (See FIG. 3). After creation of the sprite tree list by the normalizer, the sprite engine 240 traverses the sprite tree list from first to last to update an output buffer in the video adapter 148.

Figure 7A:
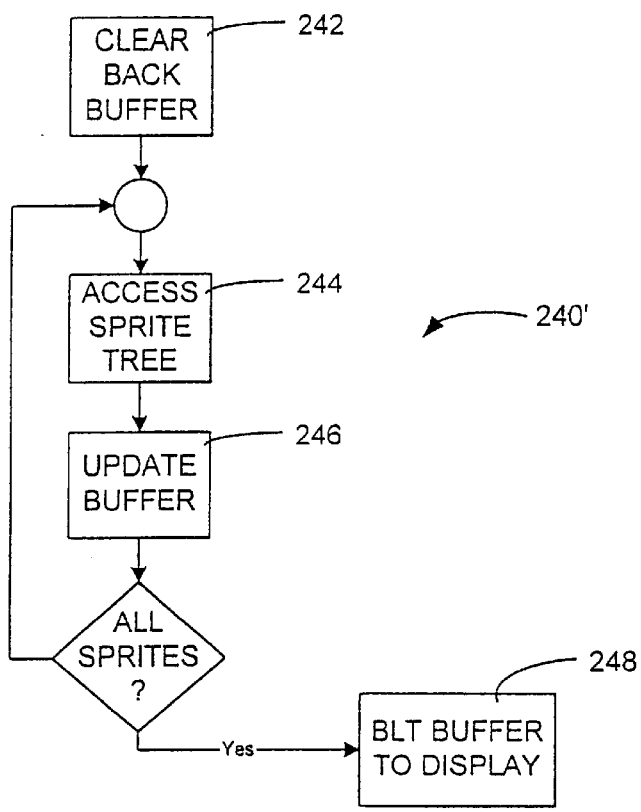
FIG. 7A illustrates the steps in interpreting a sprite tree and building a display buffer by a sprite tree engine component.
Figure 7B:
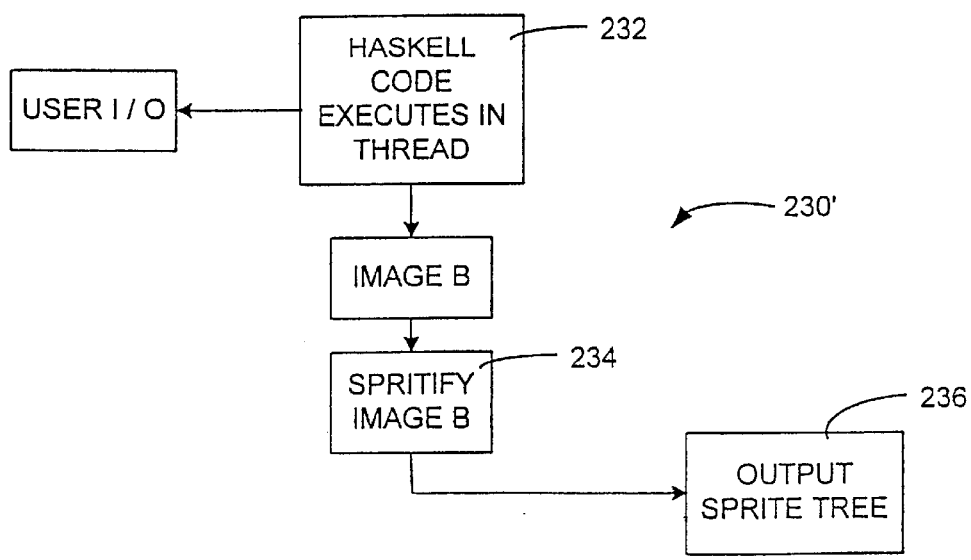
FIG. 7B illustrates the steps of creating a sprite tree by a normalizer component.
Figure 8:
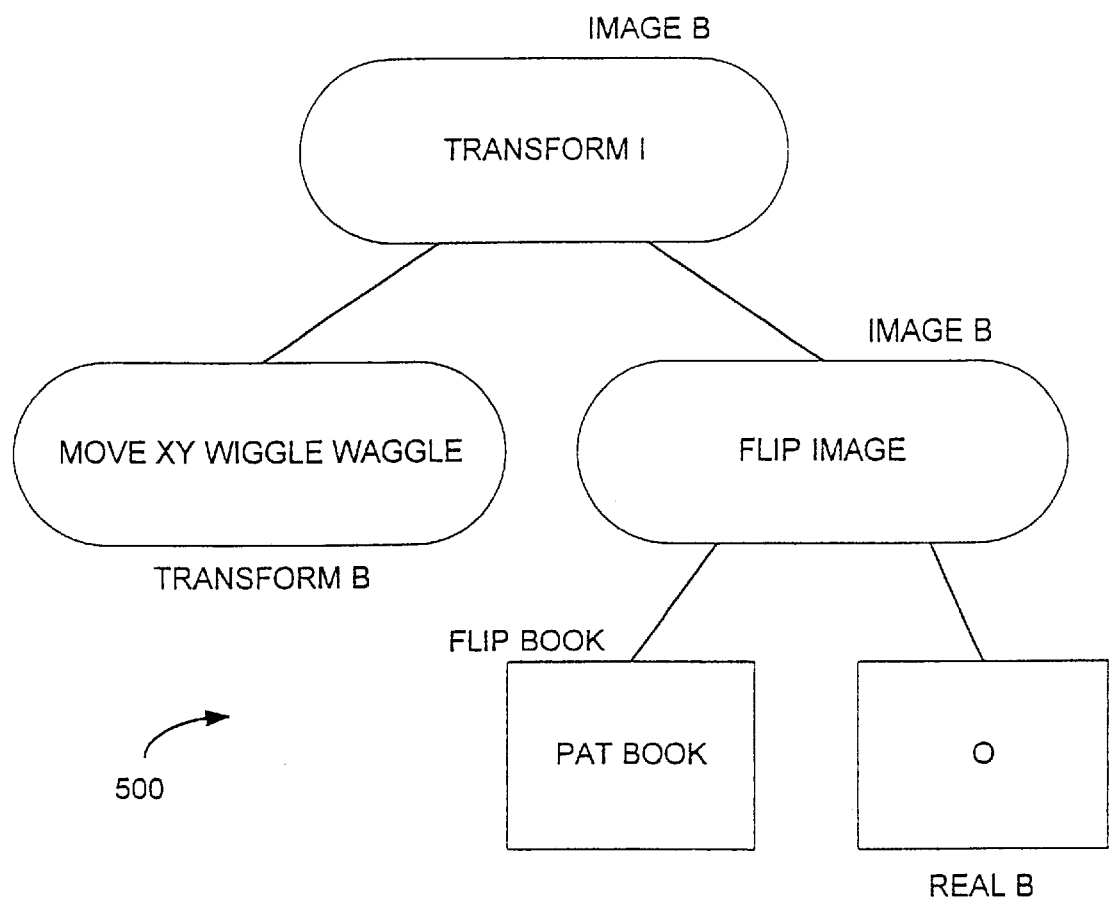
FIG. 8 is an example of a normalizer output of a representative functional animation language statement.

FIGS. 7A and 7 B are flowcharts 230', 240' showing the operations of the normalizer 230 and the sprite engine 240, each of which run in its own thread in a multitasking operating system. The functionality of the normalizer 230 is depicted in FIG. 7B. The normalizer is written in Haskel but interfaces to C++ data structures and also calls certain of the functions that are implemented in C++. The normalizer interpreprets the Haskell code 232 for accomplishing the animation and performs its spritify function 234 on an ImageB data type to produce one or more sprite trees 236. In an instance of multiple trees the normalizer forms a linked list of sprite trees. For an instance of circular motion the normalizer produces a single flipsprite which is a tree with one node. This updating of the sprite tree list takes place at a first rate which in one presently preferred embodiment for practicing the invention occurs every 1/10 second.

In FIG. 7A, one sees the steps performed by the sprite tree engine 240. The sprite tree engine writes to an output buffer at a rate at least once every sixtieth of a second. The sprite tree engine initially clears 242 the output buffer in video memory. The buffer is a so-called back buffer since the bitmapped image created in this portion of memory is not displayed, but instead serves as a holding location that is updated as the list of sprite trees is traversed. The sprite tree engine repeatedly accesses 244 the sprites of the sprite tree and updates 246 a video buffer. Once the entire tree list has been traversed the contents of the back buffer are transferred 248 to video memory by a rapid transfer (a blit).

The definition of an instance of type Flipsprite for the circular motion example is contained above. An object of type Flipsprite includes a pointer to a instance of type Flipbook which defines a bitmapped image in video memory. The instance of class Flipsprite inherits from the type TransformableSprite which contains two protected fields of type LinearDouble designated as 'm_posX' and 'm_posY'. These values are the positions of the sprite and are instantiated by a constructor function when the Flipsprite is created. The Flipsprite constructor (called by the normalizer) passes an initial value to the two variables 'm_posX' and 'm_posY'. The normalizer periodically updates these position values (by means of an update function defined as part of the flipsprite) as the animation takes place. For the example of simple circular motion, the normalizer updates the position values by causing them to move in a circle about the center of the circle.

The definition for instances of type 'SpriteTree' has a virtual 'Paint' method which takes as input parameters a surface to draw onto and a time. The 'Paint' function is a pure virtual function for an object of type 'SpriteTree' and must be implemented by an instance of a class that inherits from the Spritetree class. When a sprite tree is created, it may be the first tree in which case there are no links to other trees. If the normalizer determines the animation involves only a single sprite such as is the case for the simple circular motion there are no other sprites trees in the list. If there is a list of sprites trees already created, however, when the normalizer creates a new sprite tree, the new tree is created and linked at the head of the existing sprite tree list.

One chain of inheritance is: Spritetree -> ImageSprite -> TransformableSprite -> FlipSprite. An instance of type FlipSprite paints itself on the video monitor by inheriting the 'Paint' method from a class called TransformableSprite.

The paint function takes as an input parameter a paint time which is a real number intermediate the two immediately preceding times at which the normalizer has updated the sprite tree list. The 'Paint' function first locks other threads that are running and in particular locks the thread doing updates. The function then performs a 'GetSrc' from the flipsprite instance being painted. This causes the paint function to obtain a DirectDraw surface on which to draw and a cropping rectangle to use in performing the paint function. The 'Paint' function for a Flipsprite instance is inherited from a class transformablespite.

The TransformableSprite definition of 'Paint' has an input parameter the time t, and a drawing surface to which it is to transfer an image. The function GetSrc for a flipsprite determines which page of the potentially multi-page Flipsprite is to be rendered. The 'Paint' function next samples the flipsprite position by calling the at(t) function of the 'm_posX' and 'm_posY' fields (of type Lineardouble) and returns updated positions of those fields in the variables moveX and moveY. These variables are real double variables and correspond to the position of the image of the object of type FlipSprite.

The at(t) function for determining the X and Y positions respectively for the Flipsprite 'Paint' function uses two times that are updated by the normalizer m_startVal and m_startTime to calculate a new value of moveX and moveY based on a speed variable m_speed which is calculated by the normalizer. The m_speed variable is defined as a real double precision value. Its value is calculated in a SetMotion function which is called by the normalizer. Turning to the example of FIG. 4 illustrating motion between points on a curve. Although the curve in FIG. 4 approximates a sine curve, the curve could also be a segment of a circle along which the Flipsprite moves. When the normalizer calls the SetMotion function it first locks out the sprite engine and then calculates the speed. The normalizer is aware of the position and time for the two end points $x_2$, $x_3$, for example, for the Flipsprite. Based on this information the speed m_speed variable is calculated. Once this calculation is performed the thread in which the sprite engine runs can be unlocked. The sprite engine then uses the speed value to calculate an intermediate position along the linear path between the endpoints $x_2$, $x_3$ of the circular motion path 211.

The sprite engine 240 traverses all elements in a tree by calling the 'paint' function for the individual sprite that make up the leafs of the spritetree. Generally, the sprite tree is more complex than the simple Flipsprite of the circular motion example. A more general case is the sprite tree 232 of FIG. 3. This sprite tree has sprites 234 and non-leaf nodes 236. The non-leaf nodes 236 are defined as objects of type 'SpriteGroup'. The object of type 'SpriteGroup' inherits from the SpriteTree class. An instance of type SpriteGroup is initialized by the normalizer during construction of the sprite tree 232. The 'Paint' function for an object of type SpriteGroup calls a 'PaintAll' function for all child elements (sprites and SpriteGroups) that are decendents of the SpriteGroup for which 'Paint' is called. In practice, the first call is PaintAll on a chain of root nodes, which in turn calls the Paint function for each tree in the chain. These calls visit the elements of the tree in back-to-front order, left to right so that as soon as a leaf sprite is reached the paint function for that leaf is performed and the backbuffer is updated.

Each instance of type SpriteGroup has a boolean field designated as 'm_isMutable'. Initially, the value of the field is true. When it is set to false, the tree can be simplified, replacing the SpriteGroup node with its (final) list of children.

The invention supports animations for sprites of type 'Soundsprite' and sprite trees of type 'CondSpriteTree'. The objects of type Soundsprite have their own paint function which is quite different from the paint for the other sprites such as a FlipSprite. A sound sprite is positioned by the normalizer on the tree but the sprite engine responds quite differently when the 'paint' function for a 'soundsprite' is called. The sound sprite 'Paint' function interfaces with the audio interface or adapter 158 to adjust the frequency and volume of an audio output by means of calls to DirectSound control functions.

The conditional sprite tree is like any other tree positioned by the normalizer in a linked list of sprite trees. When the condition for the tree to be rendered is true, then the sprite engine executes the 'PaintAll' function on one sprite list, and when false, on another sprite list.

In the foregoing description, the invention has been described with reference to specific exemplary embodiments thereof. It will, however, be evident that various modifications and changes may be made hereto. Specifically, the examples in the functional programming language Fran derived from the Haskell language are regarded in an illustrative rather than a restrictive sense.

What is claimed is:

1. A method of performing a computer animation comprising:
   a) representing a computer animation with high level animation data types that represent a time varying computer presentation;
   b) updating the contents of a presentation data structure based on the time varying computer presentation at presentation update intervals;
   c) composing computer presentation data that approximates a change of the computer presentation at refresh intervals more frequent than said presentation update intervals; and
   d) supplying said computer presentation data to rendering hardware to perform the computer animation.

2. The method of claim 1 wherein the presentation data structure includes a sequence of visual image descriptions for display on a viewing monitor and wherein the presentation refresh intervals occur frequently enough to display video animations.

3. The method of claim 1 wherein the computer animation includes an audible rendering.

4. The method of claim 2 wherein the presentation data structure is a sprite tree and wherein at least some leaf nodes on the sprite tree represent images.

5. The method of claim 2 wherein the presentation data structure is a sprite tree and said sprite tree comprises a series of nodes with sprites at the leaves and points of structural mutability at intermediate nodes and wherein the computer presentation data is composed by painting the sprites that make up the sprite tree to a video buffer memory.

6. The method of claim 5 wherein a pair of buffers are updated during the process of traversing the sprite tree and wherein as the data in a first buffer is being updated based on the contents of the sprite tree a second buffer is controlling a visual display.

7. The method of claim 6 wherein the process of updating a sprite tree data structure updates a portion of the sprite tree affected by a user controlled input.

8. The method of claim 7 wherein the user controller input is a cursor input control having one or more user actuable buttons.

9. The method of claim 5 comprising a process of interpolating between an image position defined by successive sprite trees.

10. The method of claim 1 wherein a high level functional programming language monitors a user controllable input to the computer and uses the user controllable input to update the presentation data structure at the presentation update intervals.

11. The method of claim 1 wherein the computer includes an operating system having means for defining multiple executing threads and wherein the updating the contents of the presentation data structure is performed by a normalizer component that executes in a first thread and wherein the accessing data stored in the presentation data structure and composing computer presentation data is performed by a sprite engine that executes in a second thread.

12. The method of claim 11 wherein the second thread has a higher priority than the first thread.

13. A computer system comprising:
   a) video hardware coupled to a video display monitor to display images on said video display monitor;
   b) one or more computer processing units that execute a stored computer program;
   c) a memory unit that stores data in a presentation data structure that represents an image animation and further storing a presentation program for controlling operation of the one or more computer processing units; and
   d) said presentation program causing the one or more computer processing units to update the presentation data structure at a first update rate and also presenting image data based on the data structure to the video hardware at a second higher update rate.

14. The computer system of claim 13 wherein the presentation data structure stores a number of sprite data structures as leaf nodes on a sprite tree and wherein said sprite data structures contain descriptions of time varying properties.

15. The computer system of claim 14 wherein the presentation data structure stores a linked list of sprite trees.

16. The computer system of claim 13 additionally comprising an audio interface circuit for presenting audio signals based on the contents of the presentation data structure.

17. The computer system of claim 13 wherein the computer system includes an operating system for implementing multiple threads and wherein the presentation of graphics on a video display is performed by a sprite engine executing in one thread and the updating of the presentation data structure is performed by a normalizer executing in a second thread.

18. Apparatus for use in updating a computer presentation comprising:
   a) means for composing a computer presentation;
   b) means for updating the computer presentation at periodic intervals;
   c) means for converting the contents of the computer presentation into a presentation data structure at periodic update intervals; and
   d) means for accessing data stored in the presentation data structure to compose a computer presentation at a presentation.

19. A computer readable medium having computer-executable instructions for:
   a) representing a computer animation with high level animation data types that represent a time varying computer presentation;
   b) at presentation update intervals, updating the contents of a presentation data structure based on the time varying computer presentation;
   c) at presentation refresh intervals more frequently that the update intervals, composing computer presentation data that approximates a change of the computer presentation between said presentation update intervals; and
   d) supplying said computer presentation data to rendering hardware to perform the computer animation.

20. The computer readable medium of claim 19 wherein the computer animation includes an audible rendering.

21. The computer readable medium of claim 19 wherein the presentation data structure is a sprite tree and wherein at least some leaf nodes on the sprite tree represent images.

22. The computer readable medium of claim 21 wherein said sprite tree comprises a series of nodes with sprites at the leaf nodes and points of structural mutability at intermediate nodes between the leaf nodes and a root node and additionally comprising a step of composing the computer presentation data by painting the sprites that make up the sprite tree to a video buffer memory.

23. The computer readable medium of claim 22 wherein a pair of buffers are updated during the process of traversing the sprite tree and wherein as the data in a first buffer is being updated based on the contents of the sprite tree a second buffer is controlling a visual display.

24. The computer readable medium of claim 22 wherein the process of updating a sprite tree data structure only updates a portion of the sprite tree affected by a user controlled input.

25. The computer readable medium of claim 22 wherein computer executable instructions interpolate between image positions defined by successive sprite trees.

26. The computer readable medium of claim 19 wherein a high level functional programming language monitors a user controllable input to the computer and uses the user controllable input to update the presentation data structure at the presentation update intervals.

27. The computer readable medium of claim 19 wherein the computer executable instructions implement an operating system having means for defining multiple executing threads and wherein the step of updating the contents of the presentation data structure executes in a first thread and wherein the step of accessing data stored in the data structure and composing computer presentation data executes in a second thread.

28. The computer readable medium of claim 27 wherein the second thread has a higher priority than the first thread.

29. A method of performing a computer animation comprising:
   a) representing a computer animation with high level animation representation that corresponds to a time varying computer presentation;
   b) converting the high level animation representation into a presentation data structure based on the time varying computer presentation; said converting performed by defining a series of different methods to convert from the representation to the presentation data structure and determining which of said different methods matches the high level animation representation;

c) composing computer presentation data from the data in the presentation data structure at refresh intervals; and d) transmitting said computer presentation data to rendering hardware to perform the computer animation.

30. The method of claim 29 wherein the presentation data structure includes a list of sprite trees representing both sound and visual image descriptions for rendering by a viewing monitor or an audio speaker.

31. The method of claim 30 wherein the high level animation representation includes conditional event decisions that are represented in the form of different branches extending from a mutable node on one or more of the sprite trees of the presentation data structure.

32. The method of claim 31 wherein during the step of converting the high level animation representation to the presentation data structure an outcome of a conditional event is used to modify a portion of a sprite tree.

33. The method of claim 29 wherein the presentation data structure is a sprite tree and said sprite tree comprises a series of nodes with sprites at the leaves and points of structural mutability at intermediate nodes and wherein the computer presentation data is composed by painting the sprites that make up the sprite tree to a video buffer memory.

34. The method of claim 30 wherein the methods are recursive methods and wherein recursive calls to said methods terminate with the addition of a sprite or sprite tree to a sprite tree list.

35. The method of claim 34 wherein the process of updating a sprite tree data structure updates a portion of the sprite tree affected by a user controlled input.

36. The method of claim 35 wherein the user controller input is a cursor input control having one or more user actuable buttons.

37. A computer system comprising:

a) video hardware coupled to a video display monitor to display images on said video display monitor;

b) one or more computer processing units that execute a stored computer program;

c) a memory unit that stores data in a presentation data structure that represents an image animation and further storing a presentation computer program that control operation of the one or more computer processing units; and d) said presentation computer program including: i) a normalizer component for causing the one or more computer processing units to update the presentation data structure at a first update rate and ii) a hardware interface program for extracting image data from the presentation data structure and then presenting the image data to the video hardware at a second, higher update rate.

38. The apparatus of claim 37 wherein the data structure is a list of sprite trees and the normalizer component addes sprites to the list in a format to provide a computer animation.

39. The apparatus of claim 38 wherein the normalizer component executes recursive calls to methods and wherein the recursive calls to said methods terminate with the addition of a sprite or sprite tree to a sprite tree list.

40. The apparatus of claim 37 wherein the animation is defined in a high level animation representation that includes conditional event decisions and wherein the normalizer converts these event decisions into alternate different branches extending from a mutable node on one or more of the sprite trees of the presentation data structure.

41. The apparatus of claim 37 additionally comprising hardware for emitting an audible sound and wherein the sprite tree lists include sound sprites containing specifications for the audible sound.

* * * * *

UNITED STATES PATENT AND TRADEMARK OFFICE
CERTIFICATE OF CORRECTION

PATENT NO.    : 6,388,668 B1
DATED         : May 14, 2002
INVENTOR(S)   : Conal M. Elliott It is certified that error appears in the above-identified patent and that said Letters Patent is hereby corrected as shown below:

Column 30,
Line 3, the following should be added after presentation and before the period at the end of the sentence -- update intervals that are shorter than the periodic update interval --.
Line 12, "that" should read -- than --.

Column 32,
Line 20, "addes" should read -- adds --.

Signed and Sealed this

Third Day of December, 2002

JAMES E. ROGAN
*Director of the United States Patent and Trademark Office*